Aug. 23, 1960

A. G. BODINE 2,949,900

SONIC LIQUID SPRAYER

Filed June 2, 1958

INVENTOR.
ALBERT G. BODINE
BY
ATTORNEY

Aug. 23, 1960           A. G. BODINE           2,949,900
SONIC LIQUID SPRAYER
Filed June 2, 1958           5 Sheets—Sheet 2
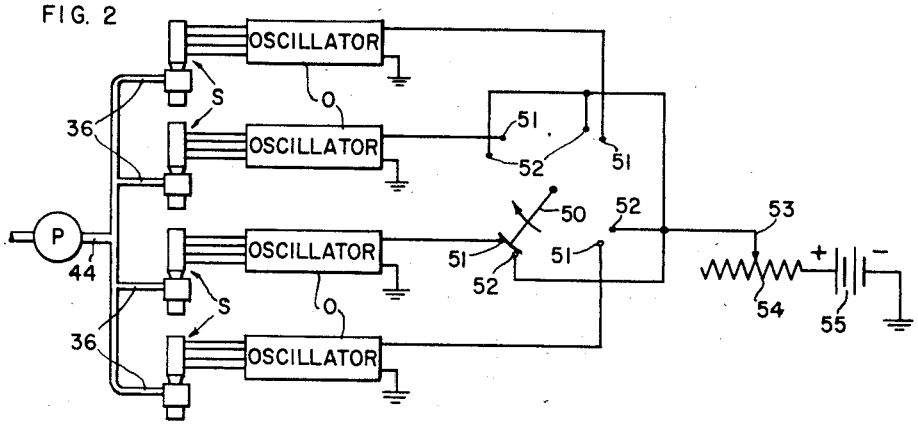
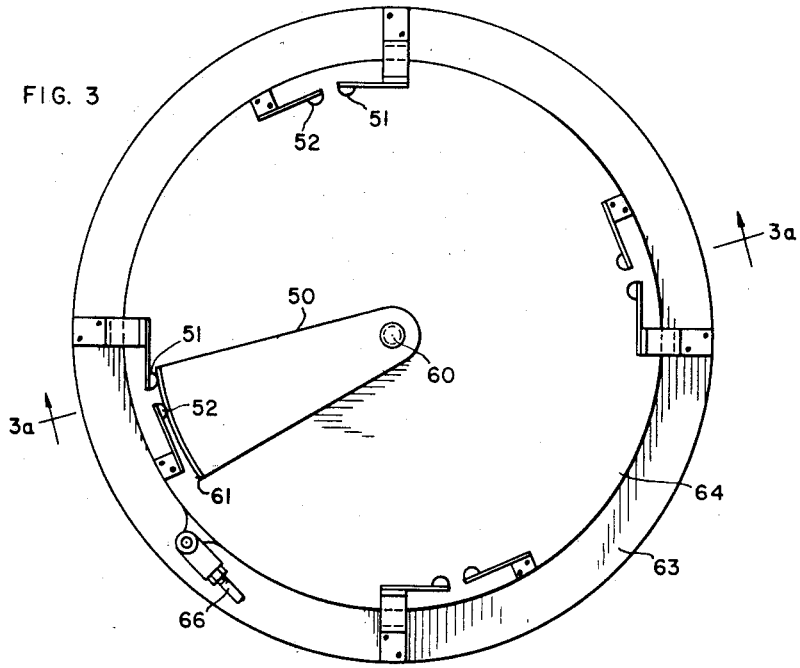
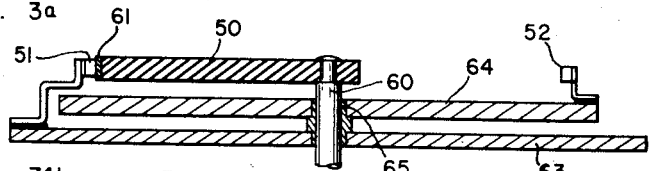
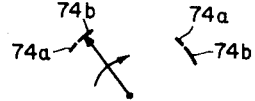
*INVENTOR.*
ALBERT G. BODINE
BY
ATTORNEY Aug. 23, 1960 A. G. BODINE 2,949,900
SONIC LIQUID SPRAYER
Filed June 2, 1958 5 Sheets-Sheet 3
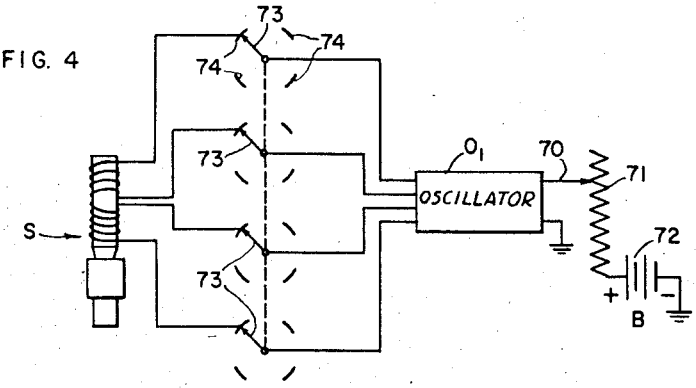
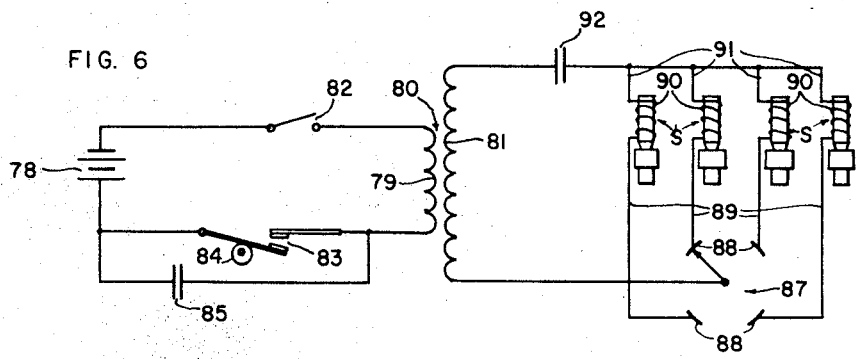
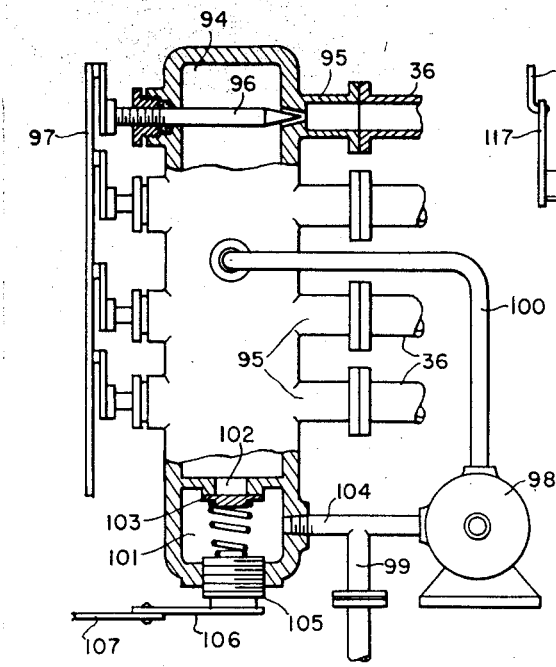
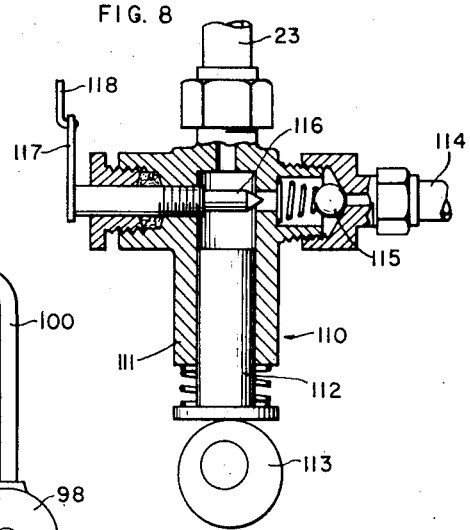
INVENTOR.
ALBERT G. BODINE
BY
ATTORNEY

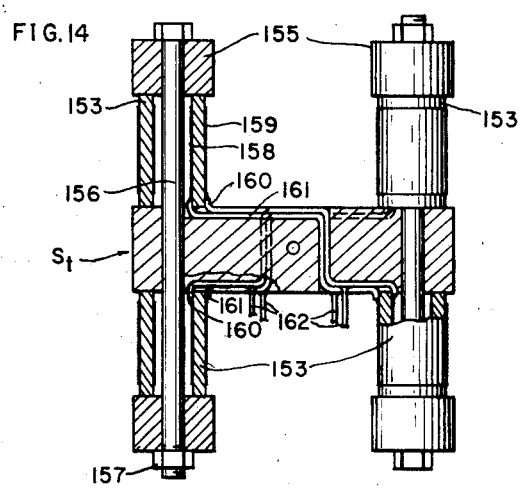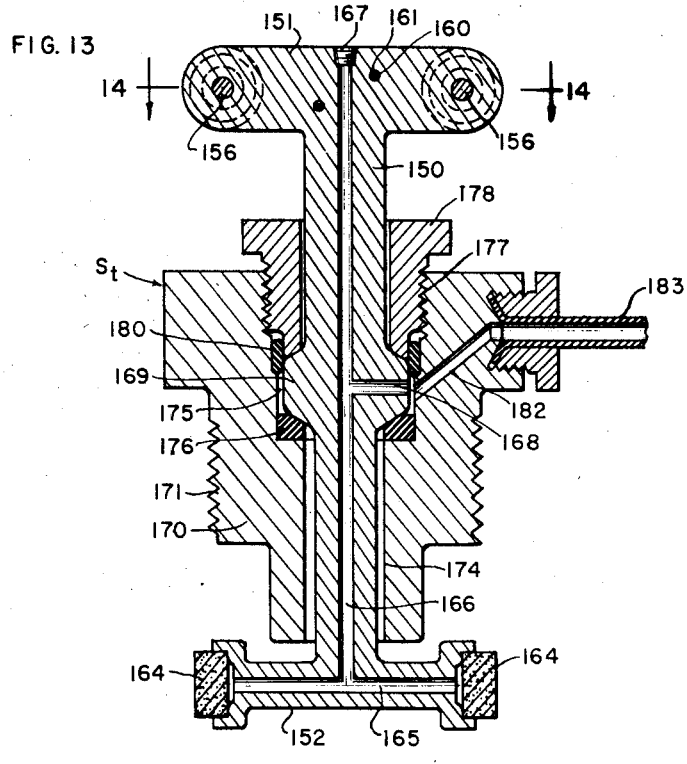

Aug. 23, 1960

A. G. BODINE 2,949,900

SONIC LIQUID SPRAYER

Filed June 2, 1958

INVENTOR.
ALBERT G. BODINE
BY
ATTORNEY

United States Patent Office 2,949,900
Patented Aug. 23, 1960

2,949,900

SONIC LIQUID SPRAYER

Albert G. Bodine, 13120 Moorpark St.,
Sherman Oaks, Calif.

Filed June 2, 1958, Ser. No. 739,301

5 Claims. (Cl. 123—32)

This invention relates generally to liquid sprayers, and more particularly to sprayers for converting liquid into a finely divided spray or vapor by sonic vibration of a wave radiator. The invention has various fields of use, such as, to name a few typical examples, fuel burner nozzles, fuel injection systems for internal combustion engines, and chemical process spraying. The invention will be primarily disclosed hereinafter as incorporated in fuel injection systems for internal combustion engines, but without necessary limitation thereto.

A general object of the invention is the provision of an improved system for spraying liquids in highly atomized form.

A further object is the provision of a liquid spraying system for accomplishing a high degree of atomization without the necessity of high hydraulic pressures.

A still further object is the provision of a liquid spraying system which is highly susceptible to accurate control of spray rate, and further related objects concern the provision of liquid spraying systems incorporating devices for accurate control of the rate of spray.

A still further object is the provision of a liquid spraying system which is precisely controllable throughout wide ranges both as regards rate of spray and as regards duty interval. That is to say, it is an object to provide a spraying system that will deliver either a continuous or an intermittent spray, and that, in the case of intermittent spray, may be controlled accurately as to timing of the spray interval, as well as to the rate of spray during the spray interval. Further objects relate to the provision of systems by which such timing and rate controls may be attained.

A further object is the provision of a system for injecting a fuel spray into an internal combustion engine, without the necessity for usual high hydraulic pressures, close-fitting nozzle valves, or any other of the expensive complications generally associated heretofore with fuel injection systems.

My invention is based upon my discovery that the acoustic mismatch at a solid-liquid interface can be used to cause accurately controlled and violent projection spraying of the liquid into a combustion space if the liquid is in the form of a capillary filament, or commensurate layer on the solid member while sonic wave energy is transmitted to the interface.

According to the present invention, the liquid to be sprayed is supplied to the surface of radiator, which is sonically vibrated at a frequency typically, though without implied limitation, of the order of 5,000 to 50,000 cycles per second. In this connection, the term "sonic" does not imply the audible frequency range, but refers, rather, to vibrations of relatively minute amplitude but relatively high energy, produced by sonic drivers such as those of the magnetostriction, electrostriction or piezoelectric type, for example. The radiator may thus be driven, for example, by a magnetostriction vibrator. Assuming a double vibration amplitude of four thousandths of an inch for the radiator, an acceleration of the order of 60 thousand times the acceleration of gravity is attained at the frequency level mentioned. The liquid to be sprayed is continuously, or intermittently, supplied to the radiator so as to wet the radiating surface thereof. It may be supplied at relatively low pressure; and this pressure, and/or the amplitude of sonic vibration, may be controllable to meter the quanity or rate of spray. Because of the low pressure, metering may be very accurate. The sonic accelerations spoken of readily disrupt the adhesive force with which the liquid film clings to the radiator, and the liquid is violently thrown off and simultaneously broken up into a highly atomized spray or mist cloud. The fineness of the spray may be controlled by controlling the frequency and amplitude of the sonic vibrations.

The manner of supplying the liquid to the surface of the radiator may take various forms within the broad purview of the invention, some of which have particular advantages as will appear. As a simple example, the liquid may merely be conveyed thereto by a suitably arranged conduit. This conduit may extend through the radiator from the back to the front face thereof, opening, for example, through the center of its front face.

A preferred form of radiator, taking advantage of the phenomena of surface tension and capillarity, consists of a sonically vibrated porous body, in an arrangement with the liquid to be sprayed supplied to its rear surface, and its capillary passages conducting fine filaments of the liquid to the front or radiating surface thereof. Fine droplets of liquid are thrown off this front surface, and/or from the forward end portions of the capillary passages, when the radiator is sonically vibrated.

As will be appreciated, the mechanical spraying of fine liquid mists requires substantial force and mechanical work in order to break the liquid into a large number of very small particles having a large aggregate surface area. This is due to the phenomena of molecular cohesion, generally referred to as surface tension, which is a powerful force acting inwardly on the molecules of a liquid body and causing the body to tend to assume a shape of minimum surface area, i.e., a sphere. To greatly increase this surface area, as is required in breaking a liquid body into fine droplets, requires that this powerful force of molecular cohesion be overcome. The present invention, in the form utilizing capillary liquid feed passages through the radiator, takes advantage of the forces of capillarity to aid in overcoming surface tension at the point where the liquid to be fed enters the fine capillary passages of the radiator. It will be seen that a vast increase in the surface area of the liquid is involved in filamenting the liquid as it enters the fine capillary passages; and that capillary forces inducing the flow of liquid into the capillary passages aid materially in accomplishing this increase in surface area in opposition to the forces of molecular cohesion. The liquid filaments in the capillary passages of the radiator, upon breaking through the front face of the latter, form a thin film of liquid thereon, which is readily disrupted and violently projected into space in finely divided droplets upon sonic vibratory activation of the radiator. In some cases, depending upon vibration activity in relation to the rate of liquid supply to the device, and to surface tension and wetting action of the liquid, the spray may be projected into space as longitudinally divided filaments directly from the capillary passages.

The spraying action may be either continuous or intermittent. For internal combustion engine fuel-spray injection purposes, the spraying action is generally intermittent. The spraying interval may be timed properly to the engine cycle by regulation of the sonic vibration interval, or, in case the fuel is supplied in pulses by a reciprocating pump, by regulation of the fuel delivery interval. Quantity of fuel injected per cycle, and rate of flow, may be controlled either by control of the sonic vibrations, or by hydraulic means, as will be described.

In the application of the invention to engine fuel injection, both spark and compression ignition engines are in contemplation. In one form of the invention, the sonic fuel sprayer is furnished with electric means for creating the spark that ignites the fuel mixture. Such device may be used in spark ignition engines and may also be used in compression ignition engines when fuels are used which may not ignite by compression alone. On the basis of a different classification, the invention is applicable to explosive mixture engines, whose air flow is throttled in proportion to fuel flow, so as to obtain an explosive mixture, as well as to excess air cycle engines, whose air intake is in excess of that for a stoichiometric mixture.

A feature of the invention, in its application to fuel injection in engines, is its ability to combat detonation, in view of the fact that the flame need not have to progress through an extended volume of explosive mixture, but rather may be controlled by the introduction of the fuel, much as in a diesel engine.

In forms of the invention utilizing a sonically vibratory spraying element of the porous, capillarity type, it is possible, by apropriate selection of materials for the porous element, to attain a useful heat exchange function, by which the fuel, during its residence in the porous element, is subjected to a temperature cycle which conditions it desirably for the immediately following ignition. Thus, it is known that certain reactions occur as a result of preheating many liquid fuels, and that the products of these reactions aid in attaining desirable forms of combustion. The porous element thus absorbs heat from the flame, and gives up a portion of this heat to the liquid fuel. The overall running temperature of the porous element can thereby be controlled, as well as the average temperature of the fuel just before introduction into the flame. Certain forms of the invention to be described hereinafter, make provisions for delivering a fuel charge to the porous element prior to sonic vibration of the element, and thus provide for a definite residence time for the fuel within the heated porous element.

Also observed heretofore are desirable chemical effects on liquid fuels and other chemicals as a result of high intensity sonic activation. The sonic sprayers of the present invention have the unique ability to sonically treat the reagent just prior to introduction into the chemical reaction.

A number of illustrative forms and applications of the invention will be disclosed, with reference to the accompanying drawings, in which:

Fig. 2 is a schematic view of a fuel injection system in accordance with the invention, incorporating illustratively sprayers of the type shown in Fig. 1;

Fig. 3 is a plan view of a modified form of timer which may be used in the system of Fig. 2;

Fig. 3a is a section taken on line 3a—3a of 3;

Fig. 4 shows a modification of the system of Fig. 2;

Fig. 5 shows diagrammatically a modification of the system of Fig. 4;

Fig. 6 shows another modification of the system of Fig. 2;

Fig. 7 is a view partly in elevation and partly in section showing fuel throttling means in accordance with the invention;

Fig. 8 shows a modification of fuel throttling means in accordance with the invention;

Figure 1:
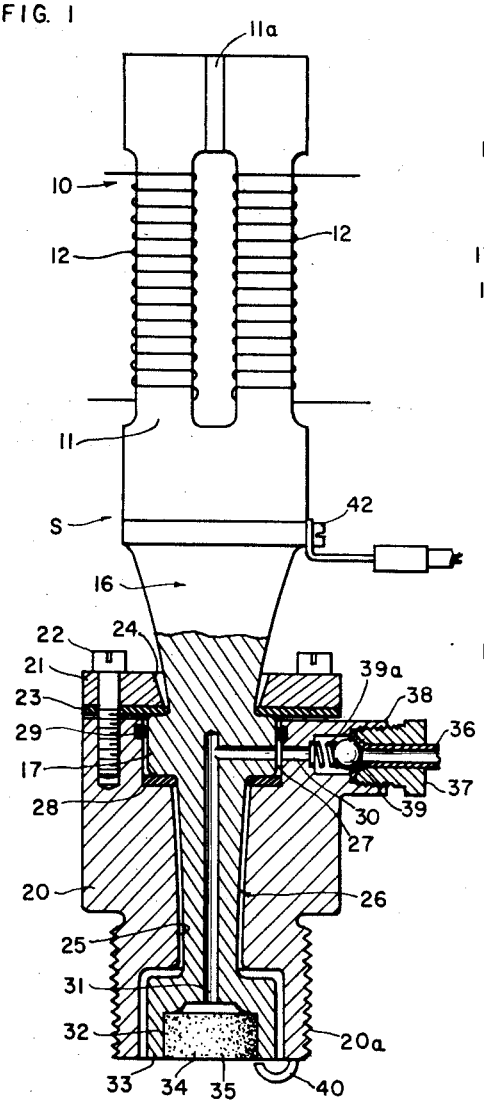
Fig. 1 is a view partly in elevation and partly in longitudinal section showing one present preferred illustrative embodiment of the invention.
Figure 12:
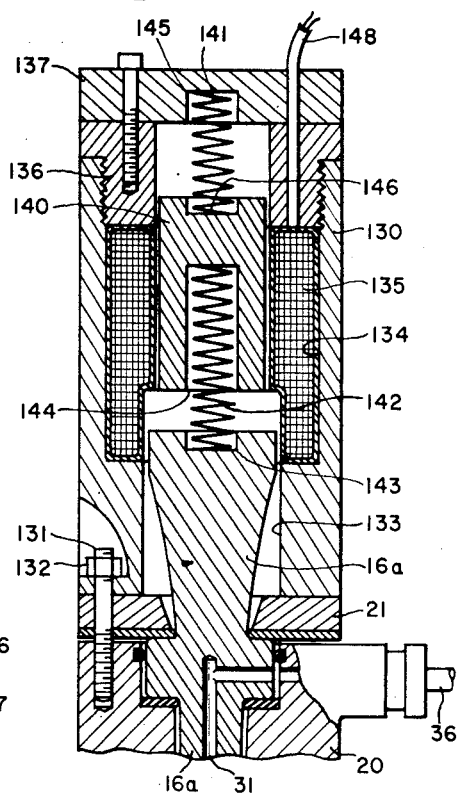
Figure 11:
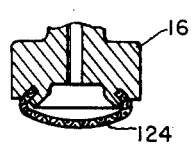
Figure 10:
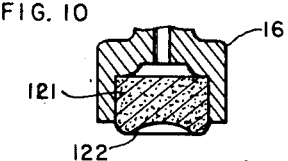
Figure 9:
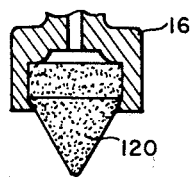
Figure 15:
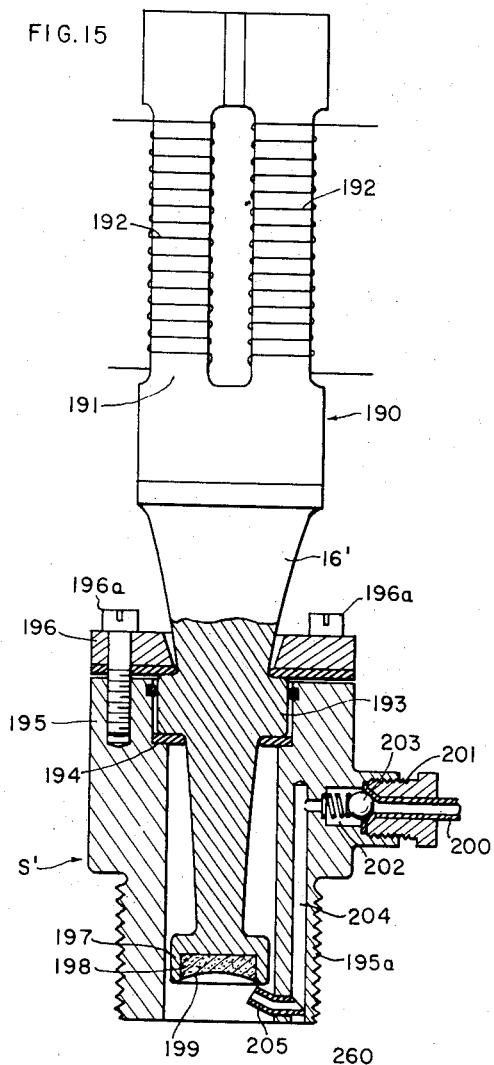
Figure 16:
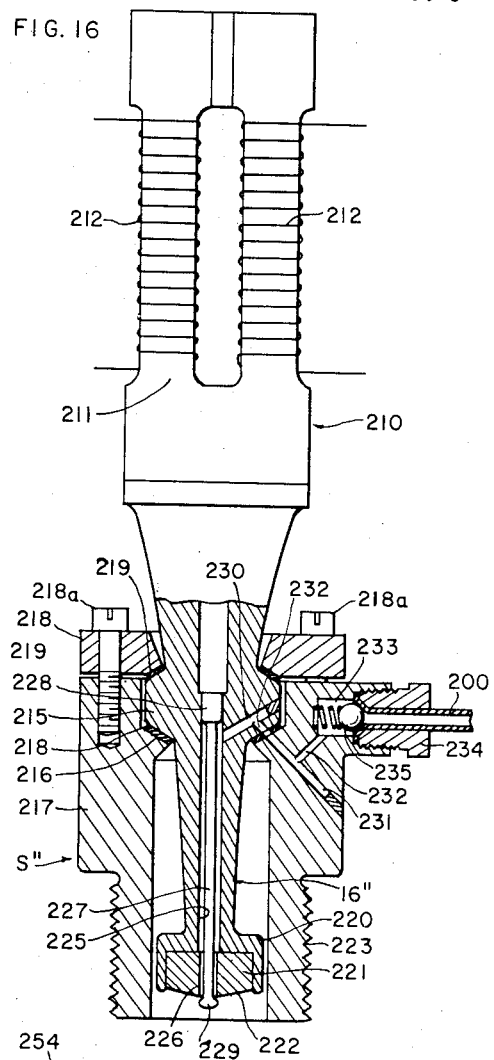
Figure 17:
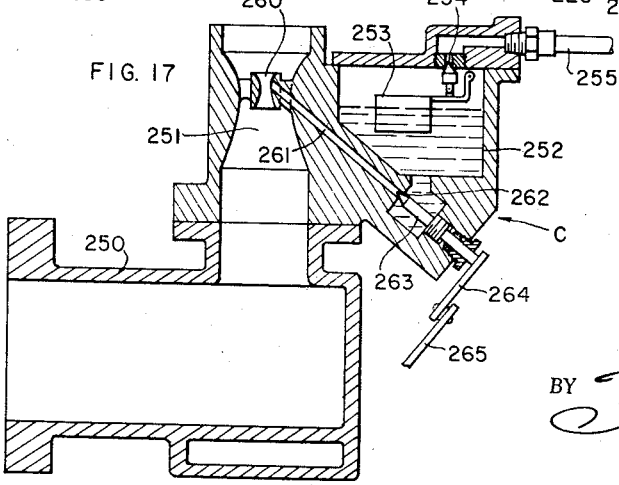

Figs. 9, 10, and 11 are sectional views showing modifications of the fuel emitter element of the device of Fig. 1;

Fig. 12 is a longitudinal sectional view of a modified form of vibrator for the sprayer of Fig. 1;

Fig. 13 is a longitudinal sectional view of a modified form of sprayer in accordance with the invention;

Fig. 14 is a section taken on line 14—14 of Fig. 13;

Figs. 15 and 16 are views partly in elevation and partly in longitudinal section showing further modified forms of sprayers in accordance with the invention; and, Fig. 17 is a sectional view through a carburetor and manifold utilized in a modified form of the invention.

With reference first to Fig. 1, showing a sonic vibratory sprayer S of the porous capillary radiator type in a form adapted for fuel injection in an internal combustion engine, numeral 10 designates generally a magnetostriction vibrator of a conventional type, made up as usual, of a core 11 consisting of a stack of nickel or nickel alloy laminations, provided with windings 12 understood to be energized from the output of an oscillator of the proper frequency. The core is shown to include a polarizing magnet 11a. Upon energization, the core of the vibrator undergoes alternate elastic elongations and contractions.

Attached, as by silver soldering, to one end of core 11 is the large end of a preferably tapered, elastically longitudinally vibratory rod 16, which because of its usual exponentially tapered shape is sometimes and will hereinafter usually be called the "horn." A tapered or horn shape is desirable, in that it results in an amplification of the vibratory movement of the free end of the member 16; but it is to be understood that the member 16 need not necessarily have this horn shape for all purposes.

In a preferred illustrative form, the core 11 of the vibrator 10 has a length equal to substantially a half-wavelength of vibratory oscillations therein at a predetermined operating frequency, and the horn 16 also has a length equal to a half-wavelength at that frequency. Actually, owing to thinned cross sections of the intermediate portion of the core that carries the windings, a half-wavelength in the core is somewhat shorter than would a half-wavelength in a bar of uniform cross section. Similarly, owing to the taper of the horn 16, its half-wavelength is slightly longer than would be a half-wavelength in a uniform bar. The horn might alternately have a length equal to any multiple of half-wavelengths by accepting the penalty of loss of compactness.

Both the core 11 and the horn 16 vibrate in resonant half-wave longitudinal standing wave nodes at the operating frequency, with velocity antinodes at the ends of each, and with a node at an intermediate point of each. The node for the horn is displaced somewhat toward its large end from the exact mid-point, and the region of this node furnishes a suitable support point for the vibratory assembly. The horn is accordingly furnished with a mounting flange 17 at the node. Surrounding the horn, from this flange to its extremity, is a body or barrel 20. A split closure cap 21 above flange 17 engages the upper end of barrel 20 and is secured thereto by cap screws 22, a gasket 23, which in some cases may be of soft copper, being used between the barrel and cap, as indicated. Cap 21 has a beveled aperture 24 receiving the horn 16, and the cap engages the gasket 23 over the top side of flange 17, extending inward into the angle between said flange and the side of the horn 16.

Barrel 20 has a longitudinal interior opening 25 which conforms generally to the flange 17 and the horn portion 26 outside or beyond the latter, its defining wall being spaced from the horn portion 26 to permit vibrations of the latter without contact with the barrel. Near the top, i.e., at the flange 17, this opening meets a counterbore 27. Flange 17 seats at the bottom on a gasket 28 on the shoulder formed by the lower side wall of this counterbore 27, and a fluid sealing O-ring 29 seals the counterbore at the top.

A liquid feed bore 30 through the side wall of barrel 20 opens into counterbore 27, and horn portion 16a has a liquid passage 31 opening at one end to counterbore 27, to receive liquid entering via passage 30, and opening at the other end to a cavity 32 formed in the enlarged extremity 33 of the horn. A porous plug or body 34, to function as a spray radiator or emitter, is tightly fitted into cavity 32, and has an exposed and somewhat extended spray radiating face 35.

The liquid to be sprayed is supplied via a tubing 36 coupled at 37 into a tubular internally threaded boss 38 which communicates with the aforementioned feed bore 30, a ball check valve 39, supported by a light spring 39a, as shown, being used in some instances to form a closure against pressure from the engine during the explosion phase of the engine cycle.

The extremity 20a of barrel 20 is shown to be reduced and externally screw threaded for reception, for example, into an internally threaded engine port leading to the combustion chamber. In the case of a spark ignition engine, this port may, in some cases, be the original spark plug port. The sprayer S may then be adapted to assume the function of spark plug, as well as fuel sprayer. Thus, the extremity of barrel 20 may be furnished with an electrode 40, spaced by a proper spark gap distance from the extremity of horn 16; and the high tension spark plug lead may be connected to the other end of the horn, as at 42. In this case, insulation gaskets would be substituted for the gaskets 23 and 28 to avoid grounding the horn to the barrel 20 and engine. Otherwise, a separate threaded engine port, in addition to the spark plug port, is provided for reception of extremity 20a, being, of course, properly positioned in relation to the combustion chamber for suitable fuel spray distribution therein. It may be mentioned that the sonic sprayer of the invention is applicable also to compression ignition engines, in which case the fuel injection interval is timed to occur as in a diesel engine.

The porous radiator 34 may be composed of sintered powdered metal, and must be very tightly mounted in the end of the horn in order to withstand the high sonic accelerations to which it is subjected without loosening. It may be suitably fixed by silver soldering. The porous radiator may alternately be composed of a porous ceramic such as fused aluminum oxide. The fineness of the capillary passages determines the fineness of the spray, and, together with the cross section of the radiator and the area of its exposed surface 35, governs the rate of emission for a given vibration amplitude and frequency, and sometimes, supply pressure. Very fine capillary passages result in the rate of emission being fairly if not completely insensitive to supply pressure. Larger bore passages permit control of rate of emission by control of supply pressure.

Assuming liquid to be continuously supplied at a suitable uniform pressure, and the vibrator to be continuously driven, the fluid reaching the porous radiator 34 via the passageway 31 enters and fills the capillary passages in the radiator 34, and is projected into space therefrom in the form of a fine spray. Depending upon specific design, as well as the nature of the liquid to be sprayed, the liquid may be projected into space directly from the forward ends of the capillary passages, or may wet the front face of the porous element, forming a film thereon, which is continuously disrupted and forcibly projected into space in the form of a finely atomized spray. Assuming a magnetostriction driver, with an elastically vibratory horn 16 as described and illustrated, energized at a frequency of the order of 50,000 c.p.s., accelerations of the order of 100,000 G are easily imparted to the porous radiator. The surface tension of the liquid film on the forward face of the porous body, and of the liquid in the forward portions of the capillary passages therein, is thereby powerfully overcome, and the liquid forcibly emitted or radiated in the form of a highly atomized cloud.

For the purpose of chemical process spraying, burners, and in other applications, the vibrator may usually be continuously driven from a continuously operating oscillator, and the liquid continuously supplied from a suitable pump, or by aid of any suitable pressure source, not shown, whereby a continuous spray is emitted. In such cases, the spray rate may be controlled by control of the amplitude of vibration, as by conventional control of the output voltage of the oscillator, or in some cases, by control of the pressure on the fluid, as by regulating the speed of a supply pump, or both.

In the application of the invention to fuel injection in internal combustion engines, it is generally desirable to effect timed, intermittent emission of spray from the sprayer or injector. One such fuel sprayer as shown in Fig. 1 and described above may discharge into the combustion chamber of each cylinder of a multi-cylinder engine. The timing of injection can be controlled by timing the initiation of sonic pulses of the vibrator. The rate and quantity of injection can be controlled by controlling the amplitude of the sonic vibration; and the quantity of injection can also be controlled by controlling the duration of the sonic vibration pulse. Still assuming such intermittent sonic vibration, the liquid may be supplied continuously under constant or controllable pressure, by a pump whose speed varies with engine speed, or may be introduced to the sprayer in pulses during properly timed intervals. Alternately, the sonic vibration can be continuous, and the liquid supplied in properly timed pulses, and the pulses can be metered. In all cases, the liquid spray is radiated during those intervals in which sonic vibration occurs and fluid is present at the surface of the radiator.

An illustrative fuel injection system according to which injection timing is controlled by pulsing the sonic vibration, with quantity and rate of spray controlled by varying vibration amplitude, will now be more particularly described with reference to Fig. 2. A plurality of sonic sprayers or injectors S of the type of Fig. 1 are used, one for each engine cylinder, and are supplied with fuel at a more or less constant rate by a conventional constant pressure fuel pump P, delivering to a header 44 feeding individual sprayers via conduits 36. For some engines having a wide speed range, a gear type pump may be used, such as will increase fuel pressure with engine speed. The windings of the magnetostriction vibrators of the sprayers S are energized from a corresponding bank of oscillators O, which may be of a type disclosed in my Patent No. 2,721,100. These oscillators deliver successive pulses to the magnetostriction vibrators of sprayers S under control of an engine driven commutator arm 50, which, for a four cycle engine, is driven at one-half engine speed. The commutator arm successively bridges pairs of contacts 51, 52, of which contacts 51 are connected to the plate circuits of corresponding oscillators, and contacts 52 are connected to the variable arm 53 of a rheostat 54 connected to the positive terminal of plate supply voltage source 55. As the commutator bridges the pairs of contacts 51, 52 in succession, the corresponding oscillators are energized, and drive the correspondinf sonic sprayers S. The timing (inception of spray interval) is adjusted by adjustment of the angular position of the commutator arm relative to that of the pairs of contacts 51, 52; and the duration of the sonic pulse is controlled by control of the spacing of contacts 51 and 52. The amplitude of the oscillations furnished to the sonic sprayers, and therefore the amplitude of vibration thereof, and the corresponding spray rate therefrom, is controlled by the rheostat 54, which controls power furnished to the plate circuits of the oscillators, and therefore oscillator output voltage. The commutator arm 50 is so timed with the engine, as indicated above, as to accomplish vibratory drive, and therefore fuel injection, from the several sonic sprayers during the desired portion of the engine cycle. For compression ignition, it may be near the end of the compression stroke.

Thus, for the system of Figs. 1 and 2, fuel is supplied constantly, at uniform pressure, or at increasing pressure with increasing engine speed, and fuel is sonically spray-injected, by emission from or radiation off the porous radiators, in step with timed, intermittent energization of the sonic injectors. Control of quantity and rate of fuel injected is by regulation of the amplitude of vibration through control of rheostat 54, which thus serves as a throttle.

The engine may also be throttled by controlling the duration of energization of the sonic sprayers. This may be typically accomplished, as suggested above, by varying the spacing of the pairs of commutator contacts 51, 52, and therefore the duration of the intervals of energization of the oscillators. A somewhat diagrammatically illustrative device for accomplishing this end is shown in Figs. 3 and 3a. The commutator arm 50, which is on a rotating shaft 60, is composed of insulation material, and carries a conductive brush 61 adapted to successively bridge pairs of contacts 51, 52. The contacts 51 are mounted on a stationary disk 63, and the contacts 52 are mounted on a disk 64 which is capable of limited rotation on a bearing 65 set tightly into the disk 63. A link 66 connected to disk 64 adjustably rotates disk 64 to vary the spacing between contacts 51 and 52, thereby adjusting the time duration of the spray interval relative to the speed of shaft 60, which of course turns proportionately to engine speed.

Fig. 4 shows a modification of the sytem of Fig. 2, wherein a single oscillator $O_1$ may serve to energize a plurality of sonic sprayers S, only one of which is shown in this instance. The plate circuit 70 of the oscillator includes rheostat 71 and source of the plate voltage 72. The usual four leads from the oscillator are connected to a bank of four commutator arms 73 turning together at half engine speed (for a four cycle engine), and each arm 73 makes successively with four contacts 74 in a corresponding bank. The four angularly corresponding contacts 74 in the four banks are connected to the usual two windings of the magnetostrictive vibrators of respective sprayers S, in the manner shown for the single sprayer illustrated. Accordingly, the four output leads of the oscillator are connected to the sprayers S in turn. Timing is again accomplished by adjustment of the commutator arm in relation to the contacts 74; and the duration of the pulse, and therefore of the spray interval, is determined by the lengths of the contacts 74, which may, if desired, be made adjustable in length.

In some cases, it is found to be an advantage to spray a preliminary quantity of fuel into the combustion chamber to initiate combustion, and then to spray in the main charge following a very short waiting interval. This may be accomplished by the modification of Fig. 4, shown in Fig. 5. Here, the contacts of one commutator bank are divided into two sections, 74a and 74b, the former relatively short and the latter relatively long. The commutator arm makes with the short contact 74a first, and a short duration vibration pulse ensues delivering a preliminary small fuel charge; and after a very short interval of time, the commutator arm makes with the longer constant 74b, giving a second, longer pulse, causing the delivery of the main fuel charge. It will be seen that the two-segment contacts need be used in but one of the commutator banks.

In Fig. 6 is shown a modified system for energizing the magnetostrictive windings for the sonic sprayers S, consisting of a plurality of damped-pulse oscillatory circuits controlled, in this case, from a type of timer breaker point assembly such as used in conventional spark ignition systems. As shown, a battery 78 is connected in circuit with the primary winding 79 of a step-up transformer 80 provided with high tension winding 81. Included in the circuit of the battery 78 and winding 79 is a switch 82 and a make-and-break switch 83 actuated by a timing cam 84 and provided with a parallel connected condenser 85. When the contacts of the switch 83 open, a high voltage is induced in the secondary winding 81. One terminal of winding 81 is connected to the rotor of a distributor 87, which has a plurality of contacts 88, one for each engine cylinder. Leads 89 from these contacts 88 go to windings 90 of the magnetostriction vibrators of sprayers S, from which return leads 91 are connected to the opposite terminal of winding 81 through a condenser 92. The circuits made up of windings 81 and 90 and condenser 92 are tuned to resonance with the magnetostriction vibrators. Breaker switch 83 and the distributor 87 are driven at a speed proportional to engine speed, and are properly timed, so that switch 83 will open while the distributor rotor is in contact with each of the distributor contacts 88. Upon each opening of switch 83, accordingly, a high voltage is generated in winding 81, and a damped oscillatory current, at high voltage, flows in the circuit to the corresponding magnetostriction vibrator. The latter is thus shock excited by a damped oscillatory current, and produces a corresponding vibration of the sprayer, and a corresponding spray emission.

In the systems described above with reference to Figs. 2–6, control of the timing, duration, and amplitude of the sonic vibration pulse controls injection timing, and both rate of fuel injection and total quantity of fuel injected. These systems are particularly, though not exclusively, suited for applications in which the fuel to be injected has a fairly high surface tension and wetting action, so that it can be easily fed into the capillary passages, but will not readily flow beyond the capillary passages and out onto the radiating surface to form a thick layer. In such a system, the sonic vibrations tend to "dry up" any thin film formed on the radiating surface as well as the fuel in the capillary passages for a short distance back within the porous element. The stronger the sonic vibration, the more will be the "drying up" of the outside region of the capillary passages. After each sonic activation pulse or interval, the outer ends of the capillary passages again fill with liquid fuel, in preparation for the next sonic pulse, the liquid being merely supplied to the back surface of the porous element under moderate pressure just sufficient to assure that said surface remains thoroughly wet at all times. The liquid in the filled porous element may in some cases wet the front face of the porous element with a thin film, and in other cases may not, depending upon such variable factors as surface tension and wetting action of the liquid, fineness of capillary passages, fuel supply pressure, etc. During periods of sonic vibration, the front face of the porous element and the forward portions of the capillary passage discharge whatever liquid fuel they have accumulated during the interruption in sonic activity. Between periods of sonic vibration, liquid is absorbed into the capillary passages by capillary forces, and the discharged quantity of liquid is exactly replaced. The stronger the vibration, the greater the quantity of liquid discharged, and the larger the automatic capillary replenishment.

Timing of fuel injection, as well as control of rate and quantity of fuel injected, may also or alternatively, be attained through hydraulic means, and such means may be employed in systems wherein the sonic vibration is continuous, or intermittent, as will be presently described. Before going into this subject, it should first be mentioned that in the cases disclosed in the foregoing, the porous radiator 34 may or may not contain capillary passages of such bore of "openness" as would permit the rate of liquid flow therethrough to be substantially influenced by the pressure at which the liquid is fed thereto. Generally speaking, with control of timing and rate of injection both dependent upon control of sonic vibrations, it is preferred, though not essential, to use capillary passages of sufficient fineness that the force of capillarity is strong or dominant, and primarily relied upon to fill the porous radiator; and in such cases, the emission rate is more or less independent of the pressure at which the liquid is supplied to the radiator, so long as the supply pressure is adequate to maintain liquid fuel constantly present at the back face of the porous radiator.

In other cases, the porous radiator 34 may advantageously have a sufficiently open porosity that the rate of liquid flow through it is substantially influenced by the pressure at which the liquid is supplied thereto. In such cases, the rate of liquid emission is subject to effective control by pressure regulation of the liquid supplied to the sprayer. A suitable pressure regulation system is shown in Fig. 5 of my prior Patent No. 2,436,090, and herein in Fig. 7. It consists of a header 94 with four branches 95 communicating with conduits 36 leading to four sonic sprayers S, for example, of the type illustrated in Fig. 1. Needle valves 96 meter the flow of fuel from header into the several branches 95. The needle valves 96 can be simultaneously adjusted through a common linkage 97 which may be operated through any suitable control for purpose of throttling the engine.

Means are provided for maintaining the header 94 filled with fuel at a constant, but adjustable, pressure. This may be accomplished by use of a pump 98 intaking from a fuel line 99 leading from a fuel tank, not shown, and discharging through a pipe 100 to the header 94. Suitable means may be provided for regulating the discharge pressure of the pump but I prefer to connect this pump in a circulatory system constructed as follows. A chamber 101 is in communication with the header 94 through an opening 102, flow through the opening being restricted by a spring-loaded valve means 103, the compression of the spring being adjustable by turning a plug 105 against which the spring bears. Chamber 101 communicates with a pipe 104 which returns fuel to the pump 98. Correspondingly, a portion of the fuel is continuously circulating from the pump 98 through the header 94, the valve means 103, and the chamber 101, returning to the intake of the pump. The pressure within header 94 can be adjusted by changing the loading of the valve means 103, and I here show the plug 105 to be provided with an arm 106, to which is connected a throttle link 107. Thus, the speed and power output of the enigne are controllable by changing the pressure in the header 94, thus changing correspondingly the pressure at which fuel is supplied to the sonic sprayers. For some variable speed engines it is desirable to make the pressure in 94 proportional to engine speed by using an orifice valve like 96, in place of spring-loaded valve 103.

With such a system, a throttled flow of fuel takes place to each sonic sprayer. This flow is continuous and at constant pressure for each setting of the throttle linkages. The fuel pressure in header 94 can be regulated by means of throttle linkage 107, and the rate of flow from the header to the feed pipes 36 can be further regulated by throttle linkage 97. Thus I have provided a versatile control system by which fuel is continuously supplied to the sonic sprayers, at controlled pressure and rate of flow. The pressure and rate of fuel flow, as determined by the throttle linkages, governs the build-up of liquid fuel in the discharge region of the capillary passages and on the exposed surface of the porous element between sonic vibration intervals. The accumulated fuel is then injected during the succeeding sonic vibration interval. The quantity of fuel injected may thus depend entirely upon the fuel pressure and rate of fuel flow, and not upon sonic vibration, though timing and rate of injection may be regulated by control of the sonic vibration.

It will thus be understood that the fuel pressure regulation system described in the immediately preceding paragraphs does not control timing of injection, and, therefore, timing is controlled by appropriate timing of the duty intervals of the sonic vibrator.

As mentioned hereinbefore, timing may also be controlled hydraulically, and for such purpose, I may use a timed fuel injection pump such as shown in Fig. 8. In said figure, the numeral 110 designates generally a timed fuel injector pump, of which one is provided for each engine cylinder. This pump includes a small cylinder 111 in which a piston 112 reciprocates under the action of a cam 113 driven at a speed proportional to that of the crank shaft of the engine. During the downstroke of the piston 112, fuel is drawn from a tank (not shown) through a pipe 114 and enters the cylinder 111 through a check valve 115. The quantity of fuel entering cylinder 111 is controlled by a needle valve 116, which is provided with an adjustment arm 117 and a throttle linkage 118. The fuel displaced by upward motion of piston 112 flows through pipe 23 leading to the sonic sprayer, again typically of the type shown in Fig. 1. Such a pump delivers metered quantities of fuel per stroke, under control of the needle valve. In this connection, the quantity of fuel intaken into the pump on each downstroke of the piston depends upon the setting of the needle valve. The variable quantity intake is permitted by reason of fuel vaporization, so that the fuel quantity intaken per stroke is governed by the setting of the needle valve rather than by the displacement volume of the pump. On each upstroke of the piston 112, the quantity of fuel intaken into the pump is discharged, and conveyed into the sonic sprayer. The actuating cams 113 for the injector pumps are timed so as to accomplish sequencing of the fuel introduction to the several sonic capillary sprayers in turn. The metered quantity of fuel is delivered to the sonic sprayer during a time interval determined for any given setting of the needle valve, by the shape of the cam, and can obviously be accomplished during a short or an extended period, depending upon the cam chosen. The time interval of fuel delivery is also variable, dependent upon the setting of the needle valve, and resulting degree of filling of the pump chamber.

Using an injector pump of the type described in the preceding paragraph, one form of the invention contemplates timing of the injection period by timing the vibration periods of the sonic sprayers, as discussed in connection with Figs. 1 to 6. In such case, the metered quantity of fuel delivered from each injector pump can be delivered during the vibration period, or prior to the inception thereof. As mentioned eleswhere herein, it is sometimes of advantage to hold the liquid fuel charge in communication with the combustion chamber for a controlled time period prior to injection, as for preliminary heat treatment; and for such cases, the fuel can be delivered from the injection pump at the appropriate time prior to sonic activation of the sprayer.

Alternatively, timing can be accomplished entirely by timing the pumps, i.e., by control of needle valve 116 (Fig. 8) or through use of cams 113 of proper shape and of properly timed position in relation to the crank shaft. In such case, the sonic sprayers may be continuously energized, or can be intermittently energized, such as with inception of vibration occurring just prior to the timed delivery of fuel thereto from the injector pump. The sprayer being in active vibration, the metered charge of fuel received from the pump is immediately forced through the porous radiator element 34, and is sprayed into the combustion chamber. In this form of the invention, in order that the rate and timing of spray emission shall fairly closely follow the controlling hydraulic events of the cycle, a porous element of somewhat open porosity is generally desirable.

Figs. 9 and 10 show modified forms of the porous emitter element, both designed for increasing the total area of the emitter surface without increase in its lateral extension. In Fig. 9, the emitter element, here designated by numeral 120, and shown as mounted in the extremity of horn 16, is in the form of a cone. In Fig. 10, the porous emitter 121 element has a concave front surface 122. The shapes of the emitter surfaces of the elements 120 and 121 will affect also, of course, the pattern of the spray. Shaping can thus be relied upon to direct the spray cloud as desired within any specific combustion chamber.

In Fig. 11, the extremity of horn 16 is provided with a fine-mesh, domed screen 124, short capillary passages being formed by the fine openings in the mesh of the screen. This screen type emitter has the advantage of improved ability to handle dirtier liquids because the capillary passages are shorter and therefore less apt to become clogged. The domed shape for the screen affords suitable stiffness so that it will be capable of partaking of the high sonic accelerations imparted to the horn.

In Fig. 12 is shown a modification of the sonic vibrator of the sprayer, it being understood that the broken away portion of the device may be similar to that shown in Fig. 1. Thus, the horn 16a is essentially similar to that of Fig. 1, as is the body 20, fluid passages, etc. The lower end of a housing or barrel 130 is secured to cap or ring 21 as by means of studs 131 and nuts 132. Extending up into this barrel 130 from its lower end is a bore 133 adapted to accommodate the upper end portion of horn 16a, and above said bore 133 is a larger bore 134 which receives a solenoid 135, and screwed into the upper end portion of barrel 130 is an annulus 136 to which is secured a closure cap 137. Within solenoid 135 and the annulus 136 is a reciprocating magnetic armature 140 operating between upper and lower springs 141 and 142, respectively. The lower end of spring 142 is accommodated in a small pocket 143 in the upper end of horn 16a, and this spring extends upwards into a bore 144 in armature 140, seating at the top at the upper end of the bore, as shown. Upper spring 141 is seated in pockets 145 and 146 in cap 137 and armature 140, respectively. Springs 141 and 142 position armature 140 normally in the position shown in Fig. 12. Upon energization of solenoid 135, accomplished through leads 148 lead upwardly through annulus 136 and cap 137, as shown, the armature 140 is pulled downwardly and strikes a blow sharply against the upper end of horn 16. The horn 16a is thereby set into a mode of damped longitudinal sonic vibration at its resonant frequency, liquid within or on the porous radiator or emitter 34 being discharged in spray form in response to this vibration until the vibration amplitude decays to the point that the forces of acceleration are no longer sufficient to break the surface tension of any liquid still clinging to the emitter. The solenoid 135 may be energized from any suitable source of electric power, and, assuming a multiple cylinder engine, the several corresponding solenoids can be sequentially energized from a single electric power source by means of a suitable timer, not shown. The device of Fig. 12 has the advantage that it eliminates the need for an oscillator for driving the sonic vibrator. The chief limitation is that the duty interval of the vibrating signal is comparatively short.

The armature or hammer member 140 is preferably short relative to a half-wavelength in the material of which the hammer member is composed. For example, it may desirably be less than a quarter of a wavelength long. In such event, the hammer member will rebound from the horn **16*a* within a small portion of a cycle, with the result that the frequency generated in the horn 16*a*** is primarily the resonant frequency of the horn itself. Thus, in this way, the hammer member is in engagement with the horn for a very short time interval, and delivers its energy in the form of a true shock excitation.

Referring further to Fig. 12 it should be noted that there are other means for actuating a hammer member, such as pneumatic, hydraulic, or mechanical cam drive.

In the illustrative sonic sprayer of Fig. 1, the sonic vibrations are in the longitudinal direction of an elongated elastic rod carrying the porous emitter at its end. However, torsional or lateral modes of elastic vibration may also be employed, just so long as sufficient sonic activity is attained to result in the necessary accelerations to overcome the adhesion of the liquid for the exposed surfaces of the porous element, or for the outside end portions of the capillary passages. It is also, of course, necessary that the direction of the sonic vibration be properly oriented in relation to the desired vapor spray pattern.

Figs. 13 and 14 show a torsional type of sonic sprayer, generally designated by $S_t$. A torsionally vibratory elastic rod 150 may have a T-head 151 at its driven end and a T-head 152 at its spray discharge end. Means are provided for exerting on T-head 151 an alternating torque about the longitudinal axis of rod 150, and the frequency of this alternating torque is made to coincide with the resonant frequency of the assembly 150, 151, and 152 for a torsional mode of vibration about the longitudinal axis of the rod 150. The characteristic fundamental vibration attained consists of alternating torsional elastic deformations of the two half-portions of the assembly about the axis of the rod 150, the upper and lower portions moving, of course, in opposite direction. There are, I have found, overtone modes of vibration, in which the two ends can move in phase, especially if clamp area 169 is not centrally located.

As one illustrative means for applying the vibratory torque, I illustrate an electrostriction type of driving means, here shown to comprise four barium titanate cylinders 153, of which two are mounted in opposition, against opposite sides of each end of the T-head 151. One end of each sleeve engages the T-head, with the other end in engagement with a clamp collar 155, long bolts 156 and nuts 157 holding the members in assembly, as clearly shown in Fig. 14. The barium titanate cylinders 153 have electrode coatings 158 and 159 on their inner and outer surfaces, and the electrode coatings of diagonally opposite pairs of cylinders are connected in parallel by conductors 160 and 161. To the interconnecting conductors 160 and 161 of each diagonally opposite pair of cylinders are connected a pair of leads 162, and each such pair of leads is energized from a suitable source of polarized alternating current, the phase relations of the two sources of alternating current being in 180° opposition. The barium titanate cylinders contract and elongate in step with the voltage waves of the alternating supply current; and it will be seen that each diagonally opposite pair of cylinders contract in unison, while the other diagonally opposite pair of cylinders simultaneously elongates. In other words, the two diagonally opposite pairs of cylinders contract and elongate in opposition to one another. The alternating contraction and elongation of each cylinder exerts an oscillatory force on the T-head 151 tending to torsionally vibrate the elastic rod 150, and it will be seen that the described interconnection of the several cylinders is such that the oscillatory forces exerted by them on the T-head 151 are additive, with the result that the corresponding end of the rod 150 is subjected to a torsionally oscillating force which is the resultant of the forces exerted by the several cylinders acting individually.

The alternating currents energizing the barium titanate cylinders are of such frequency that the torsionally oscillatory force exerted on the rod 150 corresponds to the resonant frequency of the assembly 150, 151, and 152 for a torsional mode of vibration, whereby substantial torsional vibration amplitude is attained.

The opposite end T-head 152 carries at its extremities a pair of porous fuel emitter or radiator elements 164, and these porous elements are fed by way of a longitudinal passage 165 in T-head 152, and an intersecting liquid passage 166 extending longitudinally through rod 150. The upper end of the passage 166 is plugged, as at 167, and the passage receives liquid via a transverse passage 168 intersecting the passage 166 and opening outside an intermediate flange or enlargement 169 formed on the rod 150.

The lower and intermediate portions of rod 150 are surrounded by a housing or barrel 170, having a screw threaded portion 171 for insertion into a threaded engine port. A central longitudinal bore 172 extends upwardly into barrel 170 from its lower end, and is of a diameter somewhat larger than that of the rod 150, to permit the necessary torsional vibration of rod 150 without interference. Bore 172 terminates just below flange 169, meeting an enlarged bore 175, and a gasket 176 on the shoulder formed at the juncture of bore 174 and 175 engages the underside of flange 169 and forms a liquid seal at that point. Above flange 169, bore 175 meets with an enlarged screw threaded bore 177, into which is screwed a split closure plug 178, a liquid sealing ring 180 sealing the juncture of bore 175 with plug 178, and also the juncture of plug 178 with flange 169.

The bore 175 outside flange 169 and between seal ring 180 and gasket 176 forms a fuel receiving chamber, to which fuel is delivered by a passageway 182 from a fuel supply line 183 coupled into barrel 170 as indicated.

It will be understood that the electrostriction vibrator elements may be energized by suitably timed oscillators, in general in the manner described above in connection with Figs. 1 to 6. It will further be understood that magnetostriction vibrator elements may be substituted for the electrostriction elements of Figs. 13 and 14. Thus, and without the necessity of illustration, it may readily be understood that the electrostriction cylinders 159 may be replaced by suitable magnetostriction rods or cores, provided with the necessary coils and energized by timed oscillators as disclosed in connection with Figs. 1 to 6. Moreover, the hydraulic pressure regulating and pulsing arrangements described above are equally applicable to the sonic sprayer of Figs. 13 to 14, and their application to the latter will be evident without further discussion.

The operation of the sprayer of Figs. 13 and 14 will be readily apparent from the foregoing. Briefly, the torsional vibration of the rod 150 results in torsional oscillation of the T-head 152 carrying the porous fuel emitters 164. Fuel fed to the back sides of the porous elements 164 enters therein by capillary forces, and is emitted from the front surfaces of the elements 164, or from the forward portions of the capillary passages therein, in consequence of the high torsional accelerations incident to torsional vibration.

In a modification of the invention, the sonically vibrated fuel radiator element is not of a porous or capillary nature, the fuel to be sprayed being supplied directly to its front or radiating face, and being discharged from the latter as an atomized cloud in response to sonic vibration as in the first-described forms of the invention. Such a sprayer is generally designated by the reference character S' in Fig. 15. A longitudinally vibratory "horn" 16', generally similar to the horn 16 of Fig. 1, is provided, and is set into vibration by a magneto-striction vibrator 190, comprising core 191 and windings 192, all of the same general character as in Fig. 1. The horn 16' has an intermediate or nodal point annular enlargement or flange 193, which is engaged by a supporting seat 194 formed in the upper portion of a tubular housing or barrel 195. A split cap 196 fastened to the upper end of barrel 195 by cap screws 196a engages the upper side of the flange 193, so that the horn is firmly supported at its nodal region. The lower end of the horn is formed with a cup 197 carrying a liquid radiator or emitter disc 198, shown as having a somewhat concave front face 199. Barrel 195 extends downwardly around and somewhat past the emitter element 198, and includes a reduced and screw-threaded portion 195a adapted for insertion into an engine port. The fuel supply line 200 is coupled into barrel 195 at 201, and discharges liquid fuel into a pocket 202, past a spring-pressed check valve 203. Extending from pocket 202 is a fuel passage 204 leading downwardly to a point below or beyond emitter element 198, and a fuel nozzle 205 communicates with this passageway 204 and discharges fuel onto the face 199 of the emitter 198. The emitter 198 is selected for good wetting properties, as well as for good thermal conductivity, so that it will not run so hot as to substantially vaporize the fuel. The fuel discharged onto emitter surface 199 forms a film thereon, and upon energization of the magnetostriction driver, and consequent sonic vibration of the horn 16', the liquid is discharged from the surface 199 in a finely atomized cloud. The sonic sprayer S' may be sonically timed and regulated, or hydraulically timed and regulated, both for purpose of proper timing relative to the engine cycle, as well as for control of rate and quantity of delivery, all as described in connection with earlier embodiments of the invention.

In Fig. 16, I have shown a modification of the sprayer of Fig. 15. In this instance, the sonic sprayer, here designated by the reference character S", comprises a longitudinally vibratory "horn" 16", again generally similar to the horn 16 of Fig. 1. The horn 16" is also shown to be vibrated by a magnetostriction driver 210, comprising a magnetostriction core 211 and windings 212, all generally similar to the corresponding components of Fig. 1. Horn 16" is further furnished with an intermediate mounting flange 215, located at the nodal region of the horn, and this flange seats at 216 within tubular housing or barrel 217, a suitable sealing gasket 218 being used to provide a liquid seal at the seat 216. The upper side of mounting flange 215 is engaged by split cap 218 secured to the upper end of barrel 217, by cap screws 218a, a sealing gasket 219 being used to provide a liquid seal at the juncture. The lower end of the horn is formed with a cup 220 carrying a liquid fuel radiator or emitter annulus 221, of the non-porous type, this emitter annulus having a front emitter face 222. The barrel 217 has a reduced and screw threaded extremity 223 for reception into a suitable threaded engine port, as shown.

Horn 16" is formed with a longitudinally extending bore 225 which opens within cup 220, and communicates with the central opening 226 of emitter annulus 221. A rod 227 is placed within bore 225, having an enlargement 228 at its upper end tightly fitted in bore 225 opposite nodal flange 215. This rod 227 projects, at suitable annular spacing, within bore 225 and the opening 226 of annulus 221, so as to afford a liquid fuel passage therebetween, which passage may be of capillary proportions. As here shown, the rod 227 projects a short distance beyond the face 222 of emitter element 221, and is formed at its extremity with a slightly enlarged head portion 229.

The liquid fuel to be sprayed reaches bore 225 via a passage 230 in the nodal region of horn 16", a passage 231 in the wall of barrel 217 communicating through a suitable aperture in gasket 218 with a port 232 leading to passage 230, and a passage 232 in the wall of barrel 217 intersecting passage 231 and leading from the pocket 233 into which liquid is delivered from the bore of coupling fitting 234 on the end of the supply conduit 234a. A spring-pressed check valve 235 is shown controlling the liquid fuel passage into pocket 233.

In the operation of the device of Fig. 16, the horn 16" vibrates as described in connection with Fig. 1. The rod 227, however, being fixed to the horn 16" at its central or nodal region, does not participate in this longitudinal vibration. Accordingly, the stationary rod 227 tends to keep the annulus 221 clean by virtue of the relative vibratory motion occurring therebetween. The operation of the device of Fig. 16 will otherwise be apparent. Briefly, liquid fed through the described fuel passages reaches and wets the forward surface 222 of the annulus 221, and is radiated therefrom in the form of an atomized cloud by reason of sonic acceleration imparted thereto by the vibrating horn member 16'. Control and timing may be secured as described in connection with earlier embodiments of the invention.

Application of the sonic fuel sprayer of the invention to an excess air cycle engine has been mentioned hereinabove. The concept in this instance is to employ such a sonic fuel sprayer, in combination with a special carburetor (Fig. 17) which supplies an extremely lean fuel air mixture. Let it be assumed, for example, that sonic sprayers S such as illustrated in Fig. 1 are installed in the engine (not shown) to inject a fuel spray into the combustion chambers of its several cylinders, and that the carburetor C of Fig. 17 forms a lean mixture which is delivered by way of manifold 250 into the intake ports of the cylinders. Carburetor C superficially resembles a conventional carburetor in general respects, including Venturi-throat 251, intaking from atmosphere, and delivering to manifold 250, and float chamber 252 containing float 253 which operates valve 254 controlling fuel inflow from fuel supply line 255. A small Venturi-throat 260 inside throat 251 is connected by passageway 261 to the lower portion of the float chamber, and passageway 261 has at its float chamber end an orifice seat 262 controlled by a needle valve 263, which may be adjusted by arm 264 and throttle linkage 265.

The Venturi-throat 260 applies a suction to the fuel passage 261 in proportion to air flow. Fuel passage 261 is, however, so restricted in cross-section in relation to the Venturi-throat that a proportional amount of liquid fuel for maintaining stoichiometric mixture cannot be drawn therethrough. That is to say, fuel passage 261 is made of sufficiently small cross-section in relation to the Venturi-throat 251 that, with needle valve 263 wide open, stoichiometric mixture can never be accomplished. The flow volume is then controllably reduced still further by the setting of needle valve 263. Accordingly, only very lean fuel mixtures are delivered through the manifold.

Assuming the carburetor C to feed lean mixture to the combustion chamber through the manifold, and assuming further a sonic sprayer, such as sprayer S of Fig. 1, delivering atomized fuel to the combustion chamber, it can be seen that the special carburetor C supplies additional fuel, over and above that supplied by the sonic sprayer. The atomized fuel from the sonic sprayer can be relied on for ignition. The very lean mixture supplied by the carburetor would not ignite by spark ignition. The highly atomized and sonically activated fuel supplied by the sonic sprayer, however, supplies a myriad of highly dispersed, and very sensitive ignition nuclei which are readily ignited (by spark or compression), producing a flame which ignites and burns the lean mixture from the carburetor. Because there is no propagation of flame through an explosive mixture, there is no detonation problem. Thus, with the sonic sprayer, I may use a basically excess air cycle engine, and accomplish a more complete utilization of the air than is usual with an injector type engine. In operation, the needle valve 263 may be closed, or partially closed, during normal running, and opened to the desired degree during momentary demands for high horse power.

The invention has now been described and illustrated in various illustrative forms. It is to be understood, however, that these constitute merely selected examples of typical embodiments of the invention; and that various other modifications and forms of the invention may be resorted to without departing from the spirit and scope of the appended claims. In particular, whereas electrically driven sonic vibrators have been shown, other types of vibrators may be used, such as pressure fluid driven types, as disclosed in my application Serial No. 484,627, filed January 28, 1956, entitled, Apparatus for Generating and Transmitting Sonic Vibrations, and in my application Serial No. 517,880, filed June 24, 1955, entitled, Torsional Vibration Sonic Drill.

I claim:

1. The method of injecting fuel into the combustion chamber of an internal combustion engine which includes: delivering fuel to a quiescent fuel emitter surface within said chamber until a thin film of fuel has accumulated thereon, thereafter engendering sonic frequency vibrations of said surface with a component of said sonic vibration in a direction through said fuel film so that the high acceleration incident to the sonic frequency causes said fuel film to be violently disrupted and thrown from said emitter surface.

2. The process of injecting liquid fuel into the combustion chamber of an internal combustion engine, that comprises: supplying liquid fuel to a quiescent sonically vibratory spray emitter communicating with the combustion chamber at a time prior to the combustion phase of the engine cycle, holding the fuel temporarily on said spray emitter in the quiescent condition thereof to permit heat conditioning thereof by heat originating within the combustion chamber, and thereafter, at the beginning of the combustion phase of the cycle, sonically vibrating said spray emitter to violently disrupt said heated fuel and project it into the combustion chamber in the form of an atomized spray.

3. The method of injecting fuel into the combustion chamber of an internal combustion engine which includes: wetting a quiescent fuel emitter surface within said chamber with liquid fuel prior to the combustion phase of the engine cycle so that a thin layer of fuel resides on said surface prior to combustion, and sonically vibrating said surface at the beginning of the combustion phase of the cycle, so as to cause said fuel film to be then violently disrupted and thrown from said emitter surface in an atomized spray.

4. The method of injecting fuel into the combustion chamber of an internal combustion engine which includes: delivering fuel into the capillary passages of a quiescent porous body having an emitter surface within said chamber at a time prior to the combustion phase of the engine cycle, so that fuel is present at said surface at the inception of combustion phase, and sonically vibrating said porous body at the inception of the combustion phase of the cycle, so as to cause said fuel at said emitter surface to be then violently disrupted and projected therefrom in an atomized spray.

5. In an internal combustion engine having a combustion chamber, a sonically vibratory fuel spray emitter having an emitter surface positioned within said combustion chamber, means for forming a thin film of fuel on said surface prior to inception of the combustion phase of the engine cycle, and means timed with the engine cycle to effect sonic vibration of said emitter surface at the beginning of the combustion phase of the cycle, so as to cause violent disruption of said film and projection of atomized fuel particles from said surface.

References Cited in the file of this patent

UNITED STATES PATENTS

| | | |
|---|---|---|
| 2,453,595 | Rosenthal | Nov. 9, 1948 |
| 2,791,990 | Grieb | May 14, 1957 |
| 2,791,994 | Grieb | May 14, 1957 |
| 2,855,244 | Camp | Oct. 7, 1958 |